United States Patent [19]

Anderson

[11] 4,298,091
[45] Nov. 3, 1981

[54] SELF ADJUSTABLE HARNESS OR SLING

[76] Inventor: Jeffrey J. Anderson, P.O. Box 11, Pottersville, N.J. 07979

[21] Appl. No.: 156,748

[22] Filed: Jun. 5, 1980

[51] Int. Cl.³ .............................................. A62B 35/00
[52] U.S. Cl. ........................................ 182/3; 119/96; 224/184
[58] Field of Search ........................................ 182/3–9; 119/96; 24/129 B, 129 D, 129 R; 224/184

[56] References Cited

U.S. PATENT DOCUMENTS

| | | | |
|---|---|---|---|
| 2,015,981 | 10/1935 | Welfield | 24/129 B |
| 2,663,031 | 12/1953 | Kalthoff | 182/3 |
| 2,855,133 | 10/1958 | Mullin | 119/96 |
| 2,931,629 | 4/1960 | Keller | 119/96 |
| 2,960,180 | 11/1960 | Wachtell | 182/3 |
| 2,996,228 | 8/1961 | Bauman | 119/96 |
| 3,038,644 | 6/1962 | Johnson | 119/96 |
| 3,074,074 | 1/1963 | Lovering | 182/3 |
| 3,165,168 | 1/1965 | Rose | 182/3 |
| 3,258,788 | 7/1966 | Anciaux | 182/3 |
| 3,738,449 | 6/1973 | Arancio | 182/7 |
| 4,103,758 | 8/1978 | Himmelrich | 182/3 |
| 4,159,044 | 6/1979 | Wydra | 182/3 |

Primary Examiner—Reinaldo P. Machado
Attorney, Agent, or Firm—Fisher, Christen & Sabol

[57] ABSTRACT

A harness which may be used as a sling to suspend a person from a support in either a sitting or standing position, or may be placed on the shoulder to exert force on a load includes a closed loop of webbing material which is loosely slidable through a pair of D-rings, and a double length of rope, one end of each length being connected to one of the rings with the other ends being provided with a snap-hook arrangement for encircling a support or for attachment to a load. A slider on the double rope can be moved to adjust the overall size of the sling and the webbing is held by the rings in the form of two supporting loops which adjust to the body size.

9 Claims, 5 Drawing Figures

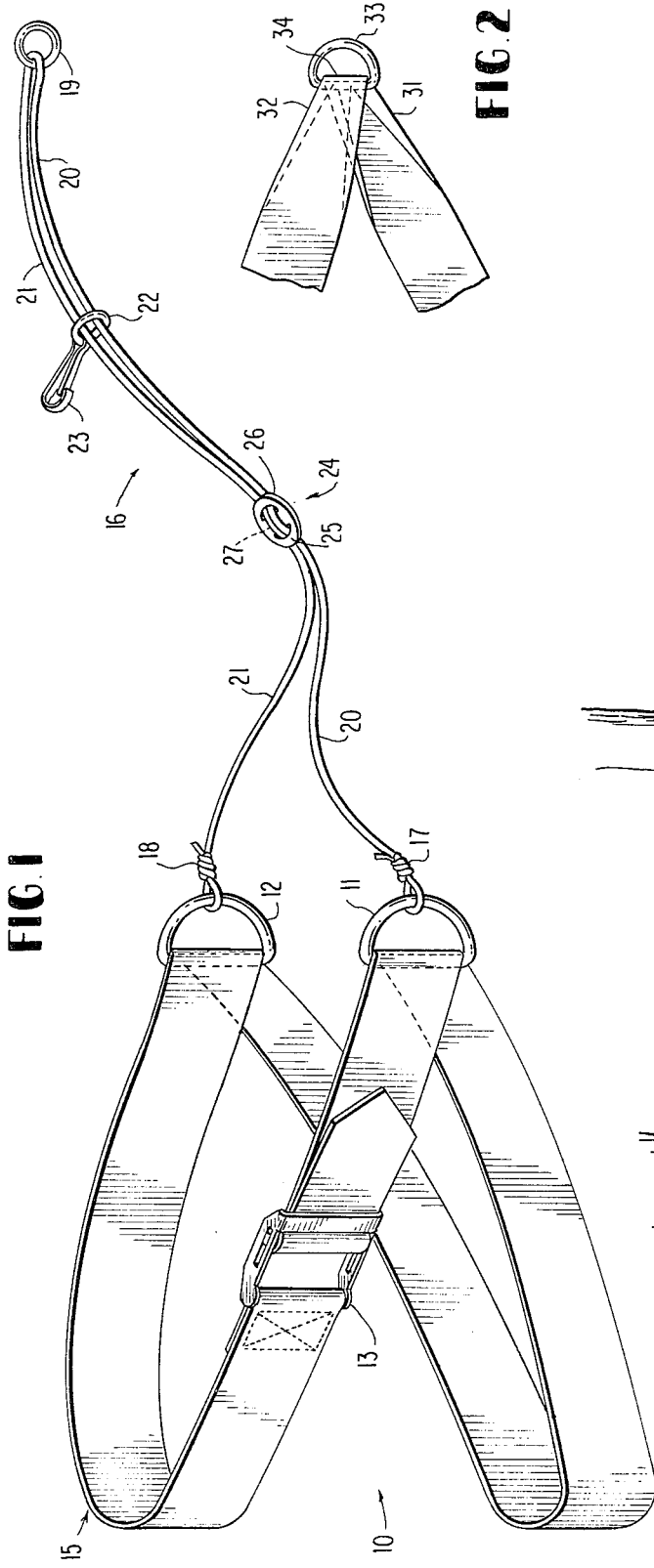
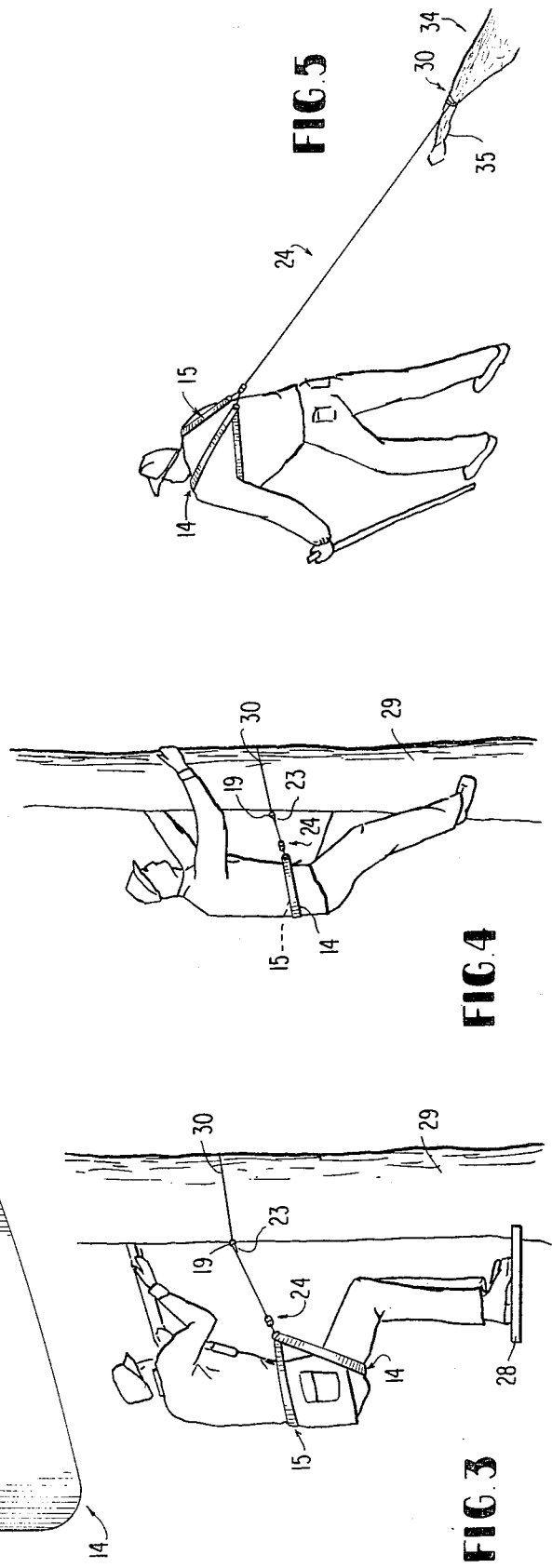

SELF ADJUSTABLE HARNESS OR SLING

BACKGROUND OF THE INVENTION

The present invention relates to a harness which among many others uses is particularly adaptable to hunters for enabling them to take up a position at a elevated position by providing a seat suspended from a tree limb which allows both hands to be free, and alternatively in the case of large animals, to allow them to drag their quarry over the ground by attaching the harness over the shoulders.

Harnesses made of webbing arranged to form a suspended seat are disclosed in U.S. Pat. Nos. 4, 103, 758, 2,960, 180 and 2,663,031 and a harness which may be attached to the shoulders is shown in U.S. Pat. No. 3,258, 788. These harnesses are not specifically intended for dual use and in any event are complex in design and difficult to fabricate.

Other types of harness of somewhat less utility, are shown in U.S. Pat. Nos. 4,120,377; 3,322,102; 3,074,074; 2,853,220; 2,651,446; 2,275,450; 1,490,066; 716,109 and 292,769.

BRIEF SUMMARY OF THE INVENTION

The harness comprises a length of strong fabric webbing which may be several inches in width which is loosely passed through a pair of D-shaped rings with the ends of the webbing thereafter being joined together in a closed loop to form two semicircular loops when suspended from the D-rings. For this purpose a length of rope, of nylon, dacron or other suitable material is passed through a ring and then doubled back upon itself, the two strands passing first through another ring provided with a snap hook and then through a frictionally engaging adjusting slide. The two ends of the rope are then attached to the respective D-rings, preferably by snap hooks, knots or adjustable connectors.

BRIEF DESCRIPTION OF THE DRAWINGS

FIG. 1 is a perspective view of a preferred form of harness in accordance with this invention;

FIG. 2 is a fragmentary view of a modified form of webbing;

FIGS. 3 and 4 are side views of the harness being used as a sling, and,

FIG. 5 is a view of the harness when used for dragging a load along the ground.

DESCRIPTION OF A PREFERRED EMBODIMENT

In the drawings, the numeral 10 indicates generally a length of fabric, such as canvas webbing several inches in width which passes through two D-shaped rings 11 and 12 and has its ends secured together by means of an adjustable clasp means 13 which allows the webbing to form a closed loop of adjustable length which, when suspended from the rings 11 and 12 is subdivided into two semicircular loops 14 and 15 whose lengths may individually vary with respect to each other in use depending upon how the harness is used. These changes are automatically accomplished because the webbing is free to move through both of the rings in either direction.

The rings 11 and 12 are attached to the respective ends of a load bearing rope, indicating generally by numeral 16, preferably by means of connectors 17 and 18. The rope passes through a ring 19 and doubled back upon itself to form two parallel strands 20 and 21 which first pass together through a loosely fitting ring 22 provided with another snap hook 23. From there the strands pass through a slidable frictionally engaging adjusting means, indicating generally by number 24. In one form this device may comprise an oblong ring having a transverse cross-bar 27 dividing the ring into two sections 25 and 26. The two strands 20 and 21 are passed upwardly through section 26, over the bar 27 and downwardly through section 25.

FIG. 3 illustrates one way in which the harness can be used, for example by a hunter, standing on the limb 28 of a tree 29. The ring 19, carrying the doubled-over end of the rope is passed around the tree 29 and engaged with the snap hook 23. One of webbing loops 14 forms a seat, while the other loop 15 serves as a back support. The sliding adjustment means 24 is pulled toward the waist where frictional engagement between the rope strands and cross-bar 27 will maintain the loops 14 and 15 in close engagement with the body. Also, as soon as any force is exerted on the rope the ring 22 will slide along the rope to a point close to the tree so that a loop 30 will be formed which will resist any tendency for the harness to slip downwardly.

While the harness described is self-adjusting in the sense that the webbing 14 is freely slidable through the D-rings 11 and 12 to allow each of the loops 14 and 15 adjust their respective lengths to conform to the anatomy of whoever is using the harnss, in some cases it may be desirable to use a form of webbing which is fabricated to urge the webbing to adopt a position with respect to the rings 11 and 12 wherein the lengths of the loops is more or less predetermined, as illustrated in FIG. 2. In this modification, once the desired relative lengths of loops 14 and 15 have been chosen the shape of the webbing is provided with a double tapering width indicated by numerals 31 and 32 along its length as it approaches one, or both, of the D-rings and, in this case, a smaller ring, indicated by numeral 33, will be substituted which has a size small enough to impede movement of the webbing in either direction away from the location of its narrowest width 34. This tapering of the webbing can be accomplished by adjustments of the textile machine which forms the web, or by folding over opposite margins and sewing them in place as shown in FIG. 2.

While FIG. 3 shows the harness as used in a seated, or semi-crouching position, the two loops 14 and 15 can be arranged to overlap each other to provide a seat, or both can be arranged around the back for climbing, or descending, the tree 29, as shown in FIG. 4.

The hunter, having bagged his game, may use the harness for dragging an animal, such as a deer 34, out of the woods, without the necessity for adjusting, or changing, the harness in any way. The loop 30, formed by attaching hook 23 to ring 19 can be placed around a part of the animal, such as a leg 35, and the loops 14 and 15 of the webbing can be slipped over the hunter's shoulders to haul the animal away. Due to the short length of rope needed to wrap around the leg 35, an extra length of the rope 24 is available than when the loop is applied to a tree trunk and this extra length allows the hunter to stand erect while pulling the load.

Other objects and advantages will be apparent to those skilled in the art which would come within the scope of the annexed claims.

I claim:

1. In a self-adjustable harness for use alternatively as a sling to support a human body or when attached to the shoulders to exert a force on a load, the combination including:
   a closed loop of webbing;
   a pair of independent rings through which said webbing is loosely slidable;
   elongated rope means having one end provided with selectable detachable connector means for attachment to a support or to a load;
   the other end of the rope means having two diverging portions, each being connected to a respective one of said rings, and;
   adjustable buckle means for adjusting the lengths of said diverging portions, whereby the rings may subdivide the webbing into two portions each of which partially encircles the same side of a body member when in use.

2. The harness of claim 1, where said buckle means comprises a fastener device slideable along the two portions of rope to adjust their respective lengths and affix harness to body.

3. The harness of claim 2, wherein said buckle means comprises a member having two closely spaced passages through which the respective diverging portions of the rope means pass in frictional engagement with said passages.

4. The harness of any one of claims 1, 2 or 3, wherein said connector means includes a third ring and said ring means comprises a single length of rope passing through said ring, the respective ends of said single length of rope being connected to said first mentioned two rings.

5. The harness of claim 4, wherein said selectable detachable connector means includes fastener means to permit said one end of the rope means to encircle an object and to be connected to an intermediate portion of the rope means.

6. The harness of claim 5, wherein said connector means includes two elements, one of said elements comprising said third ring means.

7. The harness of claim 6, wherein the other of said two elements comprises hook means slidably positioned along an intermediate portion of the rope means.

8. The harness of any one of claims 1,2, or 3, wherein said webbing is of uniform length along its entire length.

9. The harness of any one of claims 1,2 or 3, wherein said webbing is of uniform width over the major portion of its length and of reduced width along portions of its length where it normally passes through at least one of said fist-mentioned pair of rings.

* * * * *